United States Patent [19]

Paice et al.

[11] 4,296,450
[45] Oct. 20, 1981

[54] DISCRIMINATING CIRCUIT BREAKER PROTECTION SYSTEM DIRECT CURRENT POWER DISTRIBUTION SYSTEMS

[75] Inventors: Derek A. Paice, Murrysville; Alan B. Shimp, Monroeville, both of Pa.

[73] Assignee: The United States of America as represented by the Secretary of the Interior, Washington, D.C.

[21] Appl. No.: 82,383

[22] Filed: Oct. 5, 1979

[51] Int. Cl.³ .............................................. H02H 3/17
[52] U.S. Cl. ................................ 361/50; 340/310 R; 361/113
[58] Field of Search ....................... 361/42, 49, 50, 47, 361/48, 113, 92, 93; 340/310 R, 310 A; 333/80 T; 323/81, 76, 79

[56] References Cited

U.S. PATENT DOCUMENTS

| | | | |
|---|---|---|---|
| 2,874,337 | 2/1959 | Sorensen | 361/50 |
| 2,991,397 | 7/1961 | Place | 361/113 X |
| 3,072,827 | 1/1963 | Benish | 361/49 |
| 3,581,152 | 5/1971 | Hunt | 361/50 |
| 3,754,221 | 8/1973 | Stelter | 361/42 X |
| 3,946,279 | 3/1976 | Paice et al. | 361/42 |
| 3,975,663 | 8/1976 | Moorey | 361/42 |

Primary Examiner—Patrick R. Salce
Attorney, Agent, or Firm—Thomas Zack; Donald A. Gardiner

[57] ABSTRACT

An improved discriminating circuit breaker system for use with an electrically grounded direct current power distribution system. A three-tier safeguard system is provided to insure proper operation of the breaker should a fault occur. The basic components include the electrically operated circuit breaker and a control circuit therefor. The control circuit sends a control signal to the breaker to operate it depending on whether a illegitimate load is detected on the power distribution system. This detection process utilizes: a pilot wire through which any control signal flows; an alternating current (a.c) signal generator to superimpose such a signal on the transmission line; a current detector to sense the a.c. level and produce a control signal if its current value exceeds a maximum level; a voltage detector to sense the voltage level of the a.c. signal and to produce a control signal if the value falls below a minimum level; and a switch system responsive to the control signals and in series with the pilot wire to activate the opening of the circuit breaker when the wire is open or when a control signal is produced.

3 Claims, 4 Drawing Figures

DISCRIMINATING CIRCUIT BREAKER PROTECTION SYSTEM DIRECT CURRENT POWER DISTRIBUTION SYSTEMS

FIELD OF THE INVENTION

The present invention relates in general to protection of direct current power distribution systems and in particular to electronic discriminating circuit breaker protection systems for mine power distribution systems.

BACKGROUND OF THE INVENTION

Various types of systems for protecting direct current (DC) power distribution systems are known in the art. In one basic type of prior art system, which is exemplified by the system disclosed in U.S. Pat. No. 3,581,152 (Hunt), the direct current operating conditions of the distribution system being protected are monitored by voltage sensitive and/or current sensitive devices.

In another basic type of prior art system, which is exemplified by the systems disclosed in CERCHAR publication No. 1306, dated January, 1963 and published by an agency of the French government, and by the system disclosed in U.S. Pat. No. 3,946,279 (Paice et al), an alternating current (AC) signal is superimposed on the DC power signal, and faults are detected by monitoring the resultant alternating current. Since normal loads have substantial impedance at high frequencies (such as 3 KHz) and draw only a small high frequency current, whereas illegitimate loads such as arcing faults draw a substantial high frequency current, the presence of illegitimate loads are detected in such systems by the high frequency current they draw. However, the substantial inductance of mine power distribution systems makes it difficult for such protection systems to detect faults at points remote from the point at which the AC signal is superimposed on the distribution system. Attempts to overcome this problem have included (1) superimposing the AC signal at more points on the distribution systems, which has the disadvantage of requiring more oscillators and detectors; (2) reducing the impedance of the power transmission lines by running pilot wires with series capacitance parallel to the transmission lines, which is costly and difficult to implement effectively; and (3) increasing the ac impedance of legitimate loads, as exemplified by the Paice et al system, which requires significant quantities of vehicle mounted equipment, and is ineffective if the tranmission lines have a higher than normal impedance, as, for example, is caused by poor grounding or the like.

Applicant is also aware of two systems for detecting balanced ground faults in floating, or ungrounded, direct current electrical systems which employ voltage detectors. These systems are disclosed in U.S. Pat. Nos. 3,754,221 (Stetler) and 3,975,663 (Moorey). In the Stetler system, a resistance connected to each side of the floating circuit is also connected via a two-way switch to a grounded voltage detector, and the voltage drop across each resistance is measured alternatiely to detect faults. In the Moorey system, faults are detected by alternately applying first and second dc voltages having predetermined magnitudes to a ground terminal of the floating circuit which is connected to either side of an electrical supply for the floating circuit, and detecting changes in the magnitudes of the resulting voltages between the electrical supply and the ground terminal. However, in addition to requiring relatively complicated circuitry for their implementation, such systems are not readily adapted to protecting grounded power distribution systems.

SUMMARY OF THE INVENTION

These and other disadvantages of the prior art are overcome by a discriminating circuit breaker protection system constructed in accordance with the present invention, which comprises an electrically controlled circuit breaker connected between each power supply and the associated transmission line comprising a DC power distribution system, and a control circuit for controlling the operation of the circuit breakers. The circuit breakers are operable to be closed when energized and to open when de-energized, and the control circuit comprises an energizing source for producing an energizing signal for each circuit breaker; at least one pilot wire through which the energizing signal must flow to energize each circuit breaker mounted adjacent the associated transmission line; at least one signal generator for superimposing an alternating current signal on the transmission line at a location adjacent at least one of the power supplies; at least one current detector for producing a control signal when the current resulting from the alternating current signal exceeds a predetermined maximum corresponding to the presence of an illegitimate load on the power distribution system; at least one voltage detector for producing a control signal when the voltage produced by the alternating current signal in the transmission line at a location remote from the corresponding power supply falls below a predetermined minimum corresponding to the presence of an illegitimate load on the power distribution system; and a switch system which is responsive to the control signals produced by the at least one voltage detector and current detector and is connected in series in the at least one pilot wire, for, when open, disconnecting each circuit breaker from the energizing source so as to cause opening of each circuit breaker.

Other features and advantages of the invention will be set forth in, or apparent from, the detailed description of the preferred embodiments found hereinbelow.

DETAILED DESCRIPTION OF THE PREFERRED EMBODIMENTS

Figure 1:
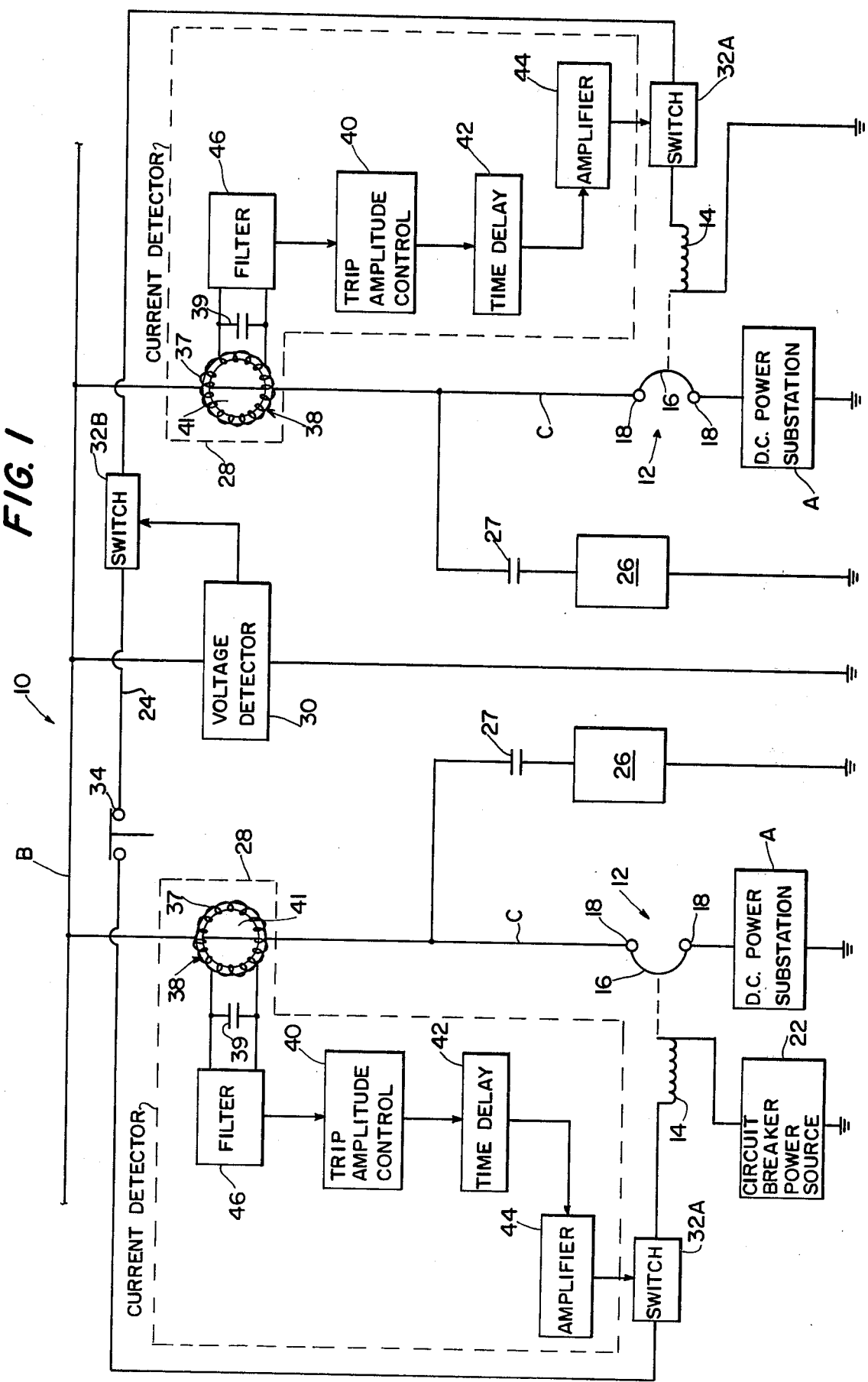
FIG. 1 is a schematic block diagram of a discriminating circuit breaker system constructed in accordance with the present invention.

Referring to FIG. 1, a discriminating circuit breaker system constructed in accordance with the present invention will now be described. The system, which is generally denoted 10, basically comprises (i) an electrically controlled circuit breaker 12 connected in series between each substation A of a plurality of DC power substations of a power distribution system and an associated trolley wire or transmission line, denoted B, which is fed by substations A, and (ii) a control circuit, generally denoted 20, for controlling the operation of circuit breakers 12.

Each circuit breaker 12 advantageously is of any conventional design which is responsive to an energizing signal so as to be closed when energized by the energizing signal and so as to be open when de-energized, i.e., in the absence of the energizing signal. As one example, circuit breaker 12 comprises, as shown schematically in FIG. 1, a contactor coil 14; a movable spring-biased magnetic contactor 16; and spaced terminals 18 which are connected to power supply A and transmission line B, respectively. As will be appreciated by those of ordinary skill in the art, coil 14 creates a magnetic field when energized which causes contactor 16 to be disposed in closed contact with elements 18. When coil 14 is not energized, contactor 16 is disposed in open relationship with elements 18 by virtue of the spring biasing thereof.

Circuit breakers 12 advantageously also are conventionally configured so as to be actuated to open in response to dc current levels which exceed a predetermined maximum.

Control circuit 20 comprises a conventional power source 22 for producing the energizing signal for circuit breakers 12; a frangible electrically conductive pilot wire 24 mounted adjacent transmission wire B and connected between circuit breakers 12 and source 22 such that the energizing signal from power source 22 must flow therethrough to energize circuit breaker 12; and a conventional alternating current signal generator 26 associated with each power substation A and connected via a conventional coupling capacitor 27 to the power distribution system so as to superimpose an alternating current signal on transmission line B at a location adjacent each substation A.

Control circuit 20 further comprises both a current detector, generally denoted 28, associated with each generator 26 for producing a control signal when the current resulting from the alternating current signal produced by the corresponding generator 26 exceeds a predetermined maximum corresponding to the presence of an illegitimate load on the power distribution system; and at least one voltage detector 30 for producing a control signal when the voltage produced by the alternating current signal in transmission line B at a corresponding location remote from substation A falls below a predetermined minimum, thereby indicating the presence of an illegitimate load on the power distribution system.

The outputs of detectors 28 and 30 are connected to a switch system comprising at least one normally closed switch connected in series with power source 22 and pilot wire 24. In the illustrated embodiment, two switches 32A and 32B are utilized. The switches 32A, 32B constituting the switch system are conventionally constructed so as to open in response to the control signals generated by detectors 28 and 30, respectively. As noted, separate switches 32A and 32B are provided for each detector 28 and 30 and these switches are connected, as shown in FIG. 1, so as to be responsive only to the corresponding detector.

Control circuit 20 advantageously also comprises at least one conventional manually controlled normally closed switch 34 connected in series relationship with pilot wire 24.

Current detectors 28 may be of any conventional design. A preferred embodiment of detector 28 comprises, as shown in FIG. 1, a current transformer, which is generally denoted 38, tuned to the frequency of operation of generator 26, a conventional adjustable trip amplitude control 40 and variable time delay 42 to control the sensitivity of operation, and a conventional signal amplifier 44, if needed, to amplify the output of transformer 38 to a level sufficient to actuate the corresponding switch(es) 32A.

The actual trip current or fault signal amplitude at which detector 28 will produce a control signal is determined by the level of impedance to be detected. For example, in a conventional coal mine power distribution system which supplies 25 ton locomotives, a legitimate load draws approximately 0.93 amperes of 3 KHz alternating current from a conventional 10 volt generator 26 when the load is located on transmission line B at the point where generator 26 is connected to transmission line B. In order to detect a 2 ohm fault in transmission line B within the effective range of a detector 28, based on a fault signal which is 50% greater than the current drawn by the largest legitimate load, detector 28 must be responsive to a minimum transformer primary current of 1.4 amperes.

In order for current transformer 38 to generate a sufficient output from the secondary thereof to generate a useable control signal, based on primary currents on the order of 1.4 amperes, transformer 38 is preferably configured so as to maximize the value of $$\frac{i_P^2 \omega_0^2 K^2 L_2^2 \mu^2}{4 r_1 n^2}$$

where:
  $i_P$ = primary current
  $\omega_0$ = the tuned frequency at which the primary current and the output voltage across a secondary load are in phase
  K = the coupling factor between the primary and secondary windings
  $L_2$ = the inductance of the secondary winding
  $\mu$ = the core permeability
  $r_1$ = the winding resistance
  n = the secondary to primary turns ratio As will be appreciated by those of ordinary skill in the art, the factor $L_2^2/n^2 r_1$ varies approximately with the volume of copper constituting the secondary windings, and thus that the output power from transformer 38 is increased if the volume of copper is increased. Any particular load impedance is readily matched for maximum power transfer by choosing the number of secondary turns appropriately.

An embodiment of current transformer 38 which has been found to be advantageous when used in conjunction with an amplifier 44 comprises a single turn primary winding which advantageously is formed by the power distribution system feeder line C connecting the associated power substation A to transmission line B, a 3000 turn, No. 21 gauge secondary winding 31 having an inductance $L_s = 35 \times 10^{-3}$H and a winding resistance $r_1 = 23.5$ ohms at 3 KHz; a 0.0804 $\mu$F tuning capacitor 39 connected across the secondary winding, and an air core 41 having a one square inch cross section. Transformer 38 is further configured so as to have a mutual inductance $M = 13.5 \times 10^{-6}$H and a primary inductance $L_p = 16 \times 10^{-9}$H.

Another preferred embodiment of the current transformer 38, which generates sufficient power to directly actuate conventional miniature relay embodiments of switch 32A without the need for an amplifier 44, comprises a single turn primary winding in the form of feeder line C; and 830 turn, No. 19 gauge wire secondary winding 31 having an inductance $L_s = 28.1 \times 10^{-3}$H and a winding resistance $r_1 = 7.07$ ohms at 3 KHz, a 0.1 μF tuning capacitor 29, and a low permeability iron powder core 31 defining a 1.7 square inch cross section. This embodiment of transformer 38 is further configured so as to have a mutual inductance $M = 37.8 \times 10^{-6}$H and a center frequency/bandwidth ratio $Q = 75$. The iron powder embodiment of core 41 advantageously is comprised of two Arnold type FE 5200-0201 cores. With an iron core of this type, feeder line C constituting the single turn primary can pass approximately 4500 amperes without noticeable saturation, and an embodiment of transformer 38 employing such a core 41 thus can be satisfactorily used in situations where the DC trip setting level for circuit breakers 12 does not exceed approximately 4200 amperes. With the iron core embodiment of transformer 38 described hereinabove, a maximum power output of 35.2 mw can be obtained with a load resistance of $39.7 \times 10^3$ ohms and a primary current of 1.4 amperes. With a non-optimum load of $10^4$ ohms, the power output would still be 22 mw at 15 volts, which is more than adequate to operate conventional miniature relay swtiches.

It is to be noted that the overall Q ratio for detector 32 (which is controlled by the load on the secondary winding of transformer 38) must not be too high when an iron core embodiment of transformer 38 is employed in order to minimize the effect of DC current on the inductance of the secondary winding. With the specific iron core embodiment of transformer 38 described hereinabove, and a $10^4$ ohm load, the trip level will not vary more than 8 percent despite 5 percent variations in inductance.

Current detectors 28 also advantageously further comprise a filter 46 connected to the output of transformer 38, as shown in FIG. 1, to prevent the different frequency AC currents which are typically normally present in conventional coal mine power distribution systems from causing detectors 28 to generate a false control signal. Currents which represent harmonics from the rectifiers associated with power substations A are particularly important, and thus filter 46 is preferably configured to reject 360 Hz AC currents.

Figure 2:
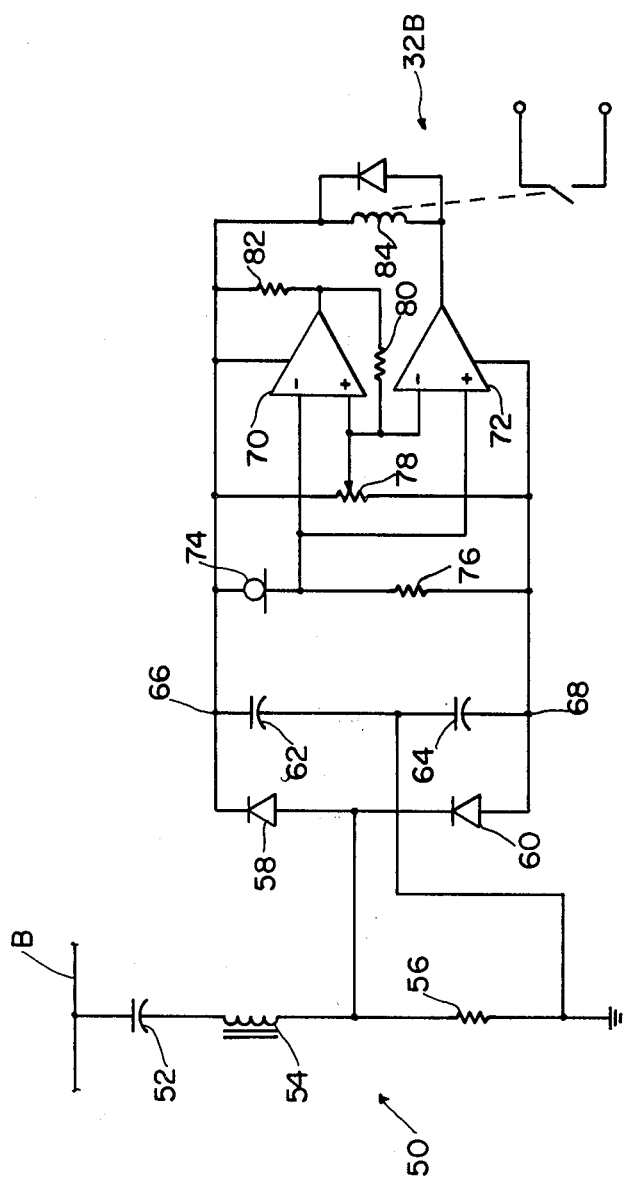
FIG. 2 is a schematic circuit diagram of a preferred embodiment of voltage detector which advantageously is employed in the circuit breaker system illustrated in FIG. 1.

Each voltage detector 39 advantageously comprises a tuned detector of conventional design, and preferably is provided with a conventional adjustable trip amplitude control and variable time delay to control the sensitivity of operation. A preferred embodiment of voltage detector 30 is illustrated in FIG. 2. The voltage detector embodiment of FIG. 2 comprises a tuned filter, generally denoted 50, connected between transmission line B and ground which provides a maximum AC output voltage at the frequency of the output of signal generator 26 and which attenuates other unwanted frequencies. As shown, filter 50 advantageously comprises capacitor 52, inductor 54, and resistor 56 connected in series. Advantageously, capacitor 52 has a capacitance of 0.033 μF, indicator 54 has an inductance of 85 mH, and resistor 56 has a resistance of 220 ohms.

The output of filter 50, taken across resistor 56, is connected as shown to a voltage doubler circuit comprising diodes 58 and 60 and capacitors 62 and 64 connected as shown to provide a DC voltage between the circuit junctions denoted 66 and 68. The capacitance of capacitors 62 and 64 determines the duration of time delay which is produced between the AC voltage appearing across filter 50 and the DC voltage appearing between junctions 66 and 68. Embodiments of capacitors 62 and 64 having a capacitance of 500 μF provide a time delay of approximately 0.2 seconds.

The voltage detector embodiment of FIG. 2 further comprises voltage comparison circuitry comprising first and second differential amplifiers 70 and 72, respectively, input circuitry comprising a constant current reference diode 74 and a resistor 76 connected as shown to junctions 66 and 68 for providing a fixed reference voltage as one input to amplifiers 70 and 72, and a variable resistor 78 connected as shown for applying a voltage derived from the voltage produced between junctions 66 and 68 as the other input to amplifier 70 and 72. A biasing resistor 80, and load resistor 82 are also connected as shown to provide, respectively, biasing for amplifiers 70 and 72, and a load for amplifier 70. The output of amplifier 72 is connected as shown to the coil 84 of a conventional, normally open, electromagnetic relay embodiment of switch 32B. As will be appreciated by those of ordinary skill in the art, so long as the voltage produced across junctions 66 and 68 exceeds a predetermined level determined by the setting of variable resistor 78 and the fixed reference voltage developed across resistor 76, relay switch coil 84 is energized by amplifier 72 and switch 32B is closed. Voltage detector 30 is configured such that, under normal operation of the power distribution system, there will be a sufficient DC voltage developed across junctions 66 and 68 to keep switch 32B energized in a closed condition. In the event of an unwanted load on the power distribution system, there will be an insufficient voltage drop across junctions 66 and 68 to keep switch 32B closed. Resistor 82 in conjunction with amplifier 70 causes the efffective load across junctions 66 and 68 to be constant regardless of whether the voltage across junctions 66 and 68 is below the threshold value and amplifier 70 powers resistor 82 or the voltage across junctions 66 and 68 is above the threshold level and amplifier 72 powers switch 32B. The time delay provided by capacitors 62 and 64 prevents momentary loss of ac voltage from causing switch 32B from becoming open. Advantageously, diode 74 has a rating of 0.3 mA, and resistors 76, 78 and 82 have resistances of 1 K, 50 K and 1 K ohms, respectively.

In accordance with the present invention detectors 30 preferably are located so as to detect faults which are effectively beyond the range of current detectors 28. As an example, detection of two ohm illegitimate loads on a coal mine power distribution system having 25 ton locomotives as legitimate loads requires that the illegitimate load be located within approximately 292.61 meters (960 feet) of a 10 volt embodiment of generator 26 and associated current detector 28 in order to have a fault signal produced which is approximately 50 percent greater than the signal level of the AC current drawn by the largest legitimate load.

Figure 3:
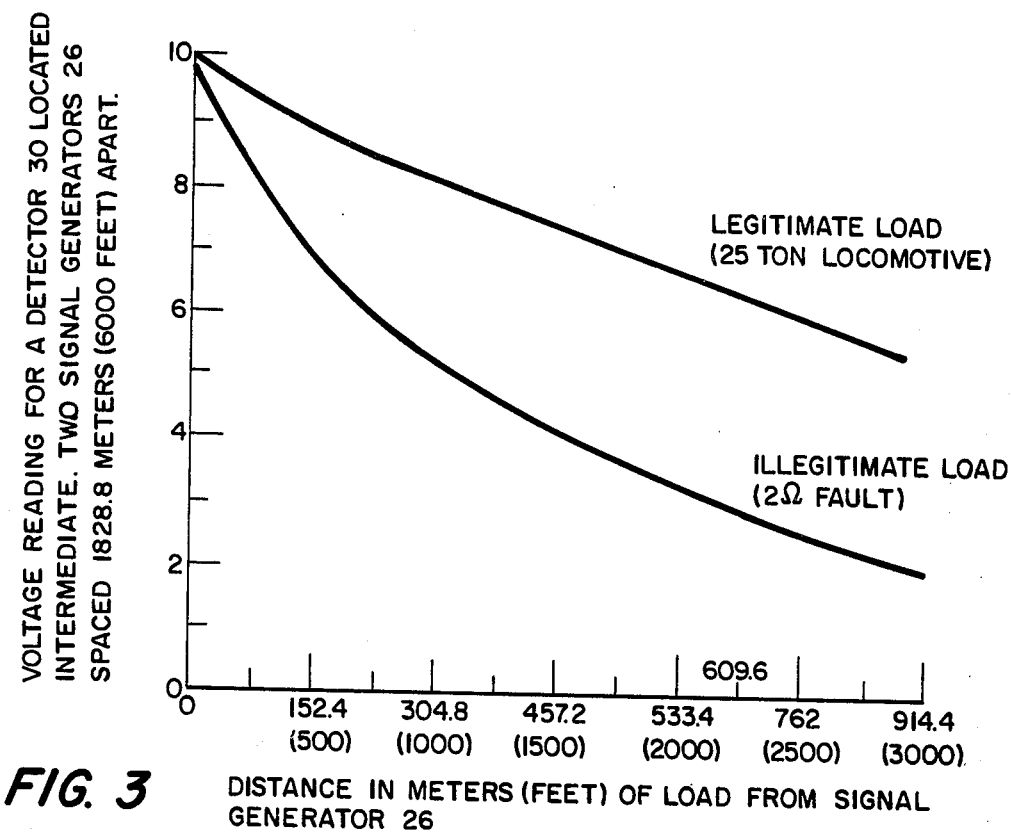
FIGS. 3 and 4 are graphical diagrams of the voltages produced by an illustrative embodiment of the system shown in FIG. 1 in the presence of legitimate and illegitimate loads at two different locations on a typical coal mine power distribution system.
Figure 4:
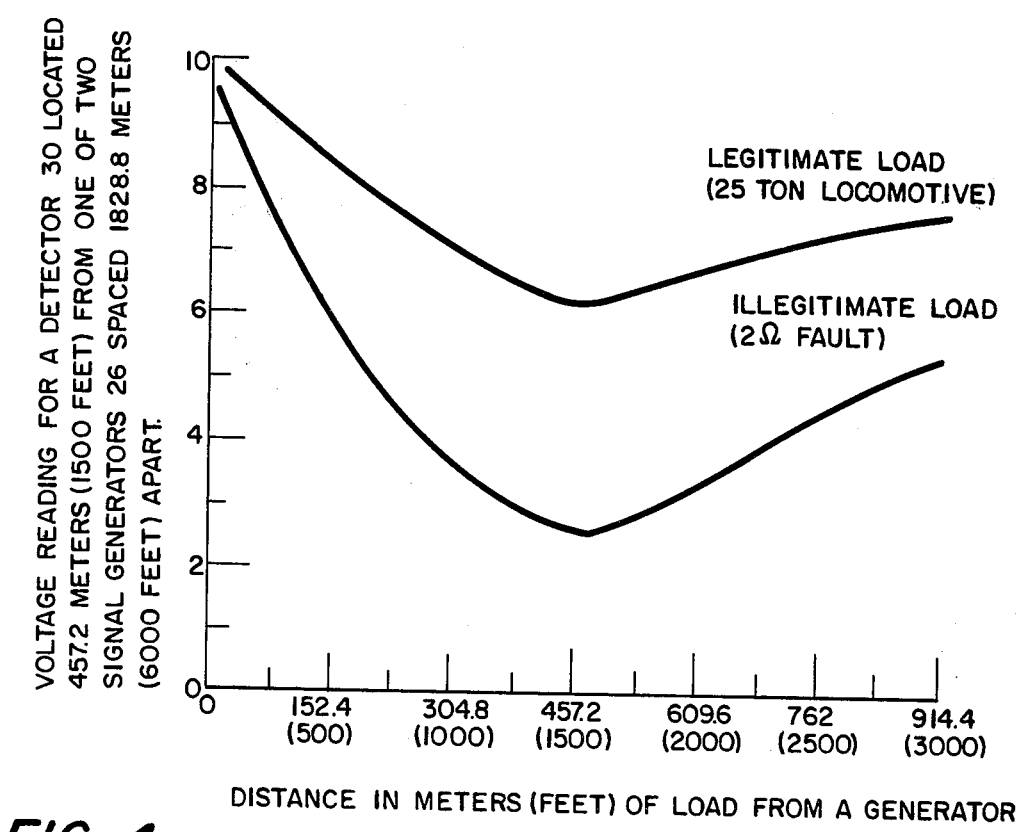

Further, the effective range of a detector 30 is dependent on the relative location thereof with respect to signal generators 26, and thus, depending on the distance between current detectors 28, a plurality of detectors 30 are preferably employed to ensure that all of a transmission line B therebetween is monitored. For example, for a circuit breaker system wherein 10 volt embodiments of generator 26 are spaced 6000 feet apart on a power distribution system having 25 ton locomotives as legitimate loads, three detectors 30 spaced at 457.2 meter (1500 foot) intervals preferably are employed. As shown in FIG. 3, a legitimate load causes a minimum voltage to be measured at a distance of 914.4 meters (3000 feet), midway between generators 26, of approximately 5.3 volts. Allowing a 50 percent safety margin to prevent nuisance tripping, setting the trip voltage of the middle detector 30 at 3.5 volts provides effective monitoring of the central portion of transmission line B between approximately 533.4 and 914.9 meters (1750 and 3000 feet) from each generator 26. As shown in FIG. 3, a legitimate load causes a minimum voltage to be measured at a distance of 457.2 meters (1500 feet) from a generator 26 of approximately 6 volts. Allowing a 50 percent safety margin, setting the trip voltage of the end detectors 30 at approximately 4 volts protects the portions of transmission line B between approximately 243.84 meters and 716.28 meters (800 and 2350 feet) from each generator 26.

It will be appreciated by those of ordinary skill in the art that the combination of current detectors 28 and voltage detectors 30 in accordance with the present invention provides optimum protection of a power distribution system since portions of a transmission line B are monitored by the type of detector which is most effective for that portion, without the need for additional signal generators 36. Further, the use of pilot wire 24 in accordance with the present invention provides a simple, independent form of fault protection against faults caused by roof falls, fires and the like in the vicinity of the pilot wire.

Although the invention has been described with respect to exemplary embodiments thereof, it will be understood that variations and modifications can be effected in the embodiments without departing from the scope or spirit of the invention.

We claim:

1. A discriminating circuit breaker system for the protection of an electrically grounded power distribution system having a power supply and a transmission line, said circuit breaker system comprising:
    an electrically controlled circuit breaker operable to be closed when energized and to open when de-energized, said breaker being connected between the power supply and the transmission line; and
    a control circuit for controlling the operation of the circuit breaker, said control circuit comprising in combination:
        means for producing an electric energizing signal for the circuit breaker;
        a pilot wire through which said energizing signal must flow to energize the circuit breaker, said wire being mounted adjacent the transmission line;
        means for producing and superimposing an alternating current signal on the grounded transmission line at a location adjacent the power supply;
        current detecting means for detecting the level of the superimposed signal and producing a control signal when the current level from said alternating current signal exceeds a predetermined maximum level, which level corresponds to the presence of an illegitimate load on the power distribution system;
        voltage detector means for detecting the voltage level of the superimposed signal above ground potential and producing a control signal when the voltage level of said alternating current signal in the transmission line falls below a predetermined minimum level, said level corresponding to the presence of an illegitimate load on the power distribution system; and
        switch means responsive to the control signals produced by the voltage detecting means and current detecting means, said switch means being connected in series with the pilot wire whereby the circuit breaker may be opened by a control signal from the voltage or the current detecting means or by the cessation of current flow through the pilot wire.

2. The circuit breaker system of claim 1 wherein said signal superimposing means superimposes a 10 volt 3 KHz alternating current signal on the transmission line.

3. The circuit breaker system of claim 1 wherein said switch means comprises a first normally closed switch connected to the current detecting means and a second normally opened switch connected to the voltage detecting means.

* * * * *